United States Patent [19]

Sharp

[11] 4,334,823
[45] Jun. 15, 1982

[54] WIND OR FLUID CURRENT TURBINE

[76] Inventor: Peter A. Sharp, 520 Utah St., San Francisco, Calif. 94110

[21] Appl. No.: 217,154

[22] Filed: Dec. 16, 1980

[51] Int. Cl.³ .............................................. F03D 3/06
[52] U.S. Cl. ..................................... 416/119; 416/139
[58] Field of Search ................... 416/139 A, 103, 104, 416/110–111, 119

[56] References Cited

U.S. PATENT DOCUMENTS

| | | | |
|---|---|---|---|
| 4,048,947 | 9/1977 | Sicard | 416/139 A X |
| 4,105,363 | 8/1978 | Loth | 416/139 A X |
| 4,178,127 | 12/1979 | Zahorecz | 416/119 X |
| 4,247,251 | 1/1981 | Wuenscher | 416/119 X |
| 4,299,537 | 11/1981 | Evans | 416/119 |

FOREIGN PATENT DOCUMENTS

| | | | |
|---|---|---|---|
| 1045038 | 12/1978 | Canada | 416/139 A |
| 598489 | 4/1978 | Switzerland | 416/139 A |
| 2040363 | 8/1980 | United Kingdom | 416/132 B |
| 708068 | 5/1980 | U.S.S.R. | 416/139 A |

Primary Examiner—Everette A. Powell, Jr.
Attorney, Agent, or Firm—Robert Charles Hill

[57] ABSTRACT

A turbine responsive to a moving fluid, which can be wind or another fluid, wherein a rotatable central shaft supports at least one radial arm with a blade assembly at the free end of the radial arm. The blade assembly includes a rocking arm pivotted on the radial arm, a blade member attached to the rocking arm, or a part thereof, and a counterweight attached to the blade. The blade assembly articulates with respect to the radial arm in response to the interaction between the moving fluid and the blade.

The turbine is self starting and self controlling in response to excessive moving fluid velocity.

27 Claims, 30 Drawing Figures

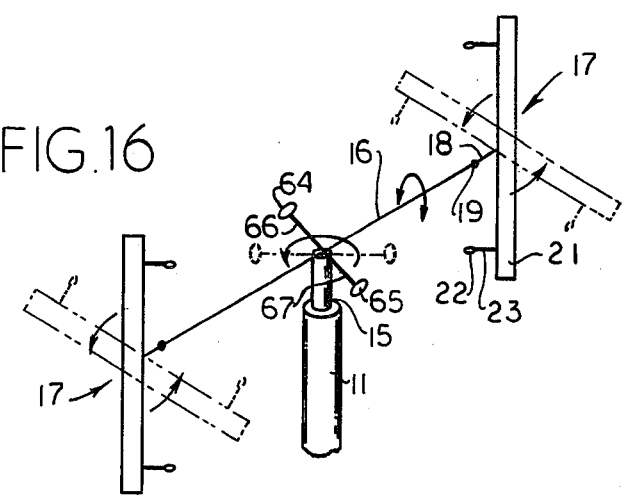
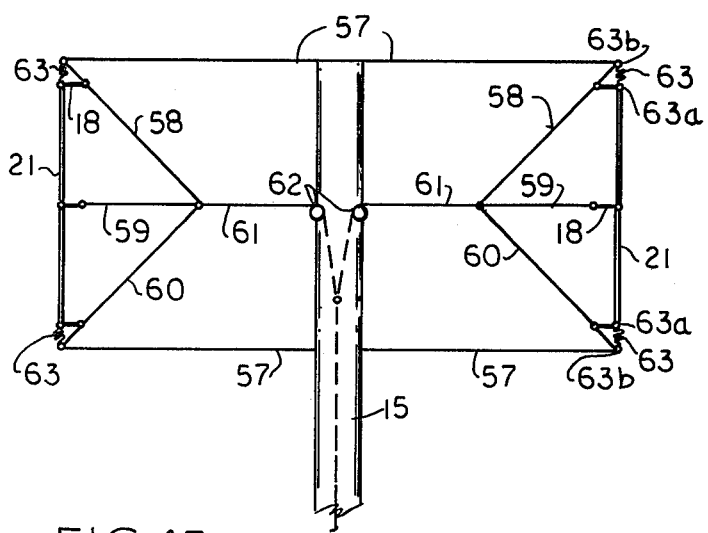
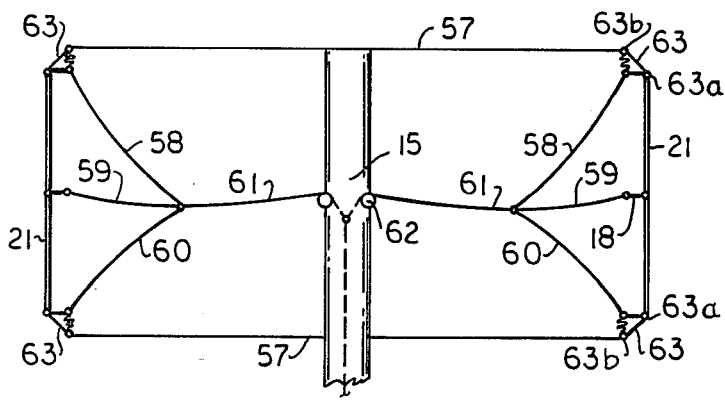
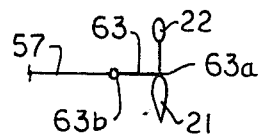
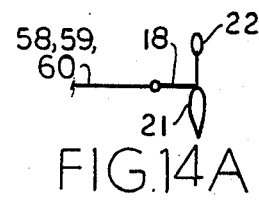
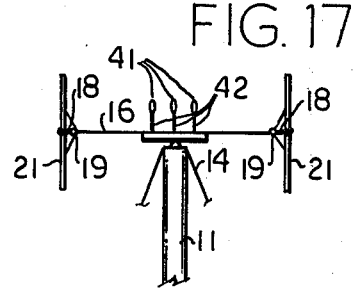
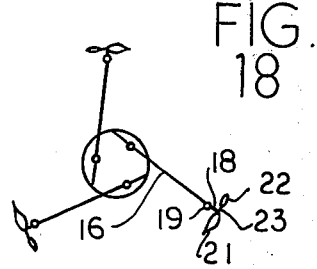
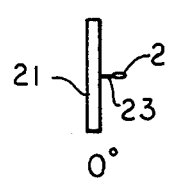
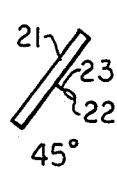
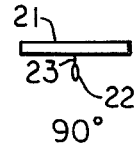

WIND OR FLUID CURRENT TURBINE

BACKGROUND OF THE INVENTION

1. Field of the Invention

This invention relates to a wind turbine and more particularly to a wind turbine employing articulating blades and overspeed control. Wind turbines of the type to which this invention relates are most usually operated with a vertical axis, although a horizontal axis form is possible. The blades of the wind turbine are automatically adjustable with respect to the relative wind while the blades rotate about the central axis.

Throughout the description of this invention, there will be frequent reference to wind turbines, it should be understood however that the turbine contemplated responds to any moving fluid stream and the invention is to be interpreted accordingly.

2. Prior Art

Vertical axis wind turbines are potentially simpler, lighter, and less expensive than other wind energy conversion systems. The ideal vertical axis wind turbine would achieve minimum weight and minimum complexity combined with maximum efficiency, so as to convert wind energy at the lowest cost. The prior art has been only partially successful, due to many interactive problems. The dominant problem is that of the very high centrifugal bending stresses which act on the vertical blades. Attempts to resolve this problem have engendered numerous secondary problems.

There are three general approaches to the problem of high centrifugal force. These approaches include (1) the use of curved blades so that blade stresses are primarily tensile; (2) the rolling, pitching, yawing, etc., of non-articulating, straight blades so as to limit centrifugal stresses; and (3) the use of blade articulation systems in order to operate efficiently at lower blade speed ratios, since centrifugal force is proportional to the square of the blade speed.

The Darrieus rotor (U.S. Pat. No. 1,835,018) exemplifies the first approach. The non-articulating, curved blades operate at a high speed ratio (6) in order to keep the angle of attack of the blades within reasonable limits. The secondary problems created by this approach include a lack of starting torque, and poor torque at low and moderate blade speed ratios. Additional components, such as a starting motor, an external power supply, a clutch, a brake, wind speed sensors, and control circuitry are required. The curved blades must be held to close tolerances to avoid excessive aerodynamic drag, and blade production therefore requires capital intensive production techniques. The curved blade configuration also limits the options for tower designs. Since the efficiency of the Darrieus rotor is only moderate, the added costs created by these secondary problems have prevented the Darrieus rotor from achieving a lower cost for wind energy conversion.

While one embodiment of the present invention includes the use of curved blades, that configuration would be limited to use under extreme weather conditions. Since that embodiment of the present invention operates at a moderate blade speed ratio (3), its cutout wind speed would be higher than that of the Darrieus rotor. Therefore, its annual energy output would be greater and, in turn, the cost of wind energy conversion would be less. The present invention does not require the use of additional components such as a starter motor, clutch, etc., since the present invention achieves high starting torque. Over-speed control is also inherent in the present system.

A second approach to the problem of centrifugal force is to use non-articulating, straight blades, and to permit the blades to deviate from their normal operating positions in order to limit the centrifugal force acting upon them. There are many obvious ways in which the non-articulating blade may deviate from their normal positions, such as rolling, pitching, yawing, distorting, extending, and variations or combinations of these. The Musgrove rotor (U.S. Pat. No. 4,087,202) employs blade rolling; the Bolie rotor (U.S. Pat. No. 4,204,805) also employs blade rolling, and blade yawing; and the Loth rotor (U.S. Pat. No. 4,105,363) employs blade pitching.

Blade rolling (Musgrove and Bolie) reduces blade bending stresses without necessarily reducing rotor rpm, whereas blade pitching (Loth) and blade yawing (Bolie) limit bending stresses by limiting rpm. Rolling, pitching and yawing all reduce the efficiency of non-articulating blades. Non-articulating, straight blades, which must operate at a high blade speed ratio, cannot be operated at full efficiency during high energy winds (over 15 mph) because the centrifugal bending stresses would exceed the strength of the blades. Consequently, these machines are forced to "spill" energy. The loss of energy can be large because wind turbines typically convert about 75% of their annual total energy during high energy winds. (Power is proportional to the cube of the wind speed.) These machines have little or no starting torque, and they require additional components for starting, etc. While it would be possible to add sufficient external bracing to enable the blades to withstand bending stresses, the aerodynamic drag induced by such bracing would be excessive. These secondary problems have prevented such machines from lowering the cost of wind energy conversion.

The turbine of the present invention is able to operate efficiently at a moderate blade speed ratio (3), and blade stresses are therefore considerably reduced. Consequently, the present turbine is able to operate at full efficiency throughout its normal operating range of wind speeds. For the present turbine, rolling, pitching, etc., of the blades need not commence until the turbine has reached its full rated power.

When rolling, pitching, etc., do commence, the blades of the present turbine simultaneously continue to articulate. The blades actually undergo a complex motion which is neither rolling, etc., nor articulating, but which may be described, for convenience, as a combination of such motions. The turbines of Musgrove, Bolie, and Loth would cease to function altogether if their blades were permitted the freedom of movement permitted the blades of the present turbine. In addition to the numerous structural differences between the present invention and the prior art of Musgrove, Bolie, and Loth, it is important to note that the underlying principles of over-speed control are fundamentally different as well. For instance, blade rolling as used in the Musgrove rotor is not the same as blade rolling as used in the present turbine. The blade motions are fundamentally different for the two turbines, even though the static representations of blade rolling tend to obscure the dynamic differences.

A third approach to the problem of centrifugal force is to articulate the blades, thereby permitting a turbine to operate at low or moderate blade speed ratios without sacrificing efficiency. Blade articulation also permits self-starting of the turbine. Blade articulation may be accomplished using either a fixed rock schedule or a variable rock schedule. A fixed rock schedule consists of a predetermined set of cyclic blade angles, which can be optimized only for a single blade speed ratio. A variable rock schedule consists of cyclic blade angles which vary with the blade speed ratio. Quite different rock schedules are required for low versus high blade speed ratios. Small deviations from an optimum rock schedule cause relatively large reductions in rotor efficiency. Since wind velocities fluctuate rapidly and continuously, wind turbines experience rapidly and continuously fluctuating blade speed ratios. Therefore, variable rock schedules are potentially more efficient than fixed rock schedules.

Darrieus (U.S. Pat. No. 1,835,018) shows a blade articulation system for lift-type vertical axis turbines. His turbine employs an eccentric with pull rods to achieve a fixed rock schedule. The articulating Darrieus rotor is relatively inefficient, however, since the resulting rock schedule is sinusoidal and therefore inappropriate.

The Dress rotor (U.S. Pat. No. 4,180,367) employs a carefully designed cam, spring-loaded pull rods between the cam and the blades, and a tail vane to orient the cam to the wind, to achieve a moderately efficient fixed rock schedule. However, since the turbine must overcome its own inertia in order to operate at a constant blade speed ratio, rotor efficiency drops off considerably in turbulent winds. This handicap, combined with the complexity and cost of the articulation system, has prevented the Drees rotor from lowering the cost of wind energy conversion.

The Giromill (no patent), developed by the McDonnell Aircraft Co., employs a variable rock schedule for blade articulation. The basic elements of the articulation system include wind sensors, feedback circuits, a computer, and electromechanical blade actuators. The turbine is quite efficient, but the high efficiency is offset by the considerable complexity and high cost of the articulation system.

The Sicard rotor (U.S. Pat. No. 4,048,947) achieves a variable rock schedule by making use of the equilibrium between opposing aerodynamic and centrifugal forces, as does the turbine of the present invention. However, the Sicard rotor uses flyweights attached to the blades in order to create the centrifugal restoring force for the blades. The use of blade flyweights increases the inertia of the counterweighted blades, and thereby reduces their responsiveness to the aerodynamic articulating forces. Although the flyweights may, alternatively, be combined with the blade counterweights if the counterweight arms are angled outward, this combination is arbitrary and does not serve to decrease the excessive blade inertia; the total weight and weight distribution of the blades remain unchanged. The Sicard rotor is handicapped by excessive blade inertia, since rotor efficiency is dependent upon the ability of the blades to respond instantly to continuous changes in both the direction and the velocity of the relative wind. Small deviations from an optimum rock schedule cause large reductions in rotor efficiency. The Sicard rotor also has poor starting torque, which is the result of allowing the blades freedom to rotate a full 360 degrees around their articulation hinges.

The turbine of the present invention does not employ the use of blade flyweights, or their equivalent, for blade articulation. Instead, the blade assemblies create their own centrifugal restoring force as a result of mounting the blades and their counterweights at the outward end of their respective rocking arms. This configuration is simpler, lighter, and more efficient than the Sicard system. The present turbine also achieves high starting torque due to limiting maximum rock angles to approximately 45 degrees. The blade assemblies of the present invention require no additional mechanisms in order to achieve a variable rock schedule, and the present turbine is able to operate at full efficiency in high energy winds.

The novel solution embodied in the present invention is the manner in which centrifugal force, itself, is used to circumvent the problems that would otherwise be imposed, directly or indirectly, by centrifugal force. None of the prior art mechanisms, of which I am aware, has suggested the lightweight, self-articulating blade assembly with inherent over-speed control and multiple speed control options as herein described, in order to simultaneously achieve simplicity, efficiency, versatility, and low cost.

BRIEF SUMMARY OF THE INVENTION

In the vertical form of the present invention, the wind turbine comprises a rotatable central shaft including suitable support bearings, horizontal supporting means operably mounted on the central shaft and having a free end extending in a radial direction from the central shaft, and a blade assembly pivotally supported on the free end of the supporting means, whereby interaction between the wind and the blade assembly causes rotation of the central shaft.

In the various forms of the invention contemplated herein, the blades can be feathered, rolled, pitched, extended, toggled, paralleled, or combinations of the foregoing, and the entire turbine may be tipped to adjust its response to the strength (or speed) of the relatively moving fluid stream. To be effective as a means for converting the energy of a moving fluid stream to rotary motion (i.e. rotation of the shaft of a turbine driving a generator), the turbine must be able to respond promptly to changes in both the speed and direction of the relative stream. Further, when the relative stream is moving at a speed that exceeds the turbine's ability to safely operate, the turbine should be able to be placed in a condition that will prevent the fluid stream from damaging or destroying the turbine. These functions are present in the design of the apparatus herein disclosed.

As used herein, the terms listed below refer to the present invention and are intended to have the following definitions, based upon the assumption that the predominant position of the blade spans is vertical, and that the blade orientations are directly analogous to boat sails with respect to yaw, roll and pitch.

1. Neutral blade position—the position a blade assumes when the turbine is rotated under windless conditions; the center of lift of the blade lies at the tangent point of the blade chord and the blade orbit.

2. blade orbit—the circular, circumferential path traced by a blade's center of lift with the blade in its neutral position.

3. Blade articulation—deviation of a blade from its neutral position for the purpose of maintaining the blade at an efficient angle of attack to its relative wind; blade rock.

4. Blade rock—the lead/lag movement of a blade about the axis of its rocking hinge; blade yaw.

5. Rock angle—the degree of lead or lag deviation of a blade from its neutral position.

6. Rock schedule—the set of cyclic rock angles used to maintain the angle of attack of the blades within efficient limits.

7. Centrifugal restoring force—the centrifugal force vector which acts to restore a blade to its neutral position.

8. Aerodynamic articulating force—the aerodynamic force vector which acts to displace a blade from its neutral position.

9. Equilibrium angle—the instantaneous rock angle which a blade assumes in response to (a) the centrifugal restoring force, (b) the aerodynamic articulating force, and (c) the rocking momentum of the blade.

10. Blade assembly—the combination of a blade and its rocking arms, counterweight arms, and counterweights.

11. Rocking arm—the structure connecting a blade to its rocking hinge, sometimes, but not necessarily, equivalent to the effective rocking arm.

12. Effective rocking arm—the structures or parts of structures which serve to join the rocking axis of a blade assembly to the spanwise centerline of gravity of the blade assembly, wherein the blade is positioned at a greater radial distance from the central shaft that is the rocking hinge, and whereby centrifugal force acting on the blade during rotation of the turbine contributes a major portion of the centrifugal restoring force.

13. Bias angle—a small, predetermined lagging rock angle when a blade is in its neutral position, in order to cause the blade chord to be tangent to the blade orbit at the center of lift of the blade, which is created by shifting the center of mass of the blade assembly slightly ahead of the leading edge of the blade; an artifact of construction which would be eliminated, for instance, by using a blade chord and counterweight arm forming a continuous curve coincident with the blade orbit.

14. Blade speed ratio—the velocity of the blades divided by the velocity of the true wind.

15. Polar angles—angular positions on the blade orbit, proceeding counterclockwise, with the true wind assumed to be coming from the direction of 90 degrees.

16. Weathervaning—the tendency of an airfoil to align itself parallel to its relative wind if its axis of rotation is generally forward of its center of pressure.

17. Blade feathering—a general principle of speed control in which a blade is caused to function at an inappropriate angle of attack—too high or too low.

18. Blade rolling—a general principle of speed control in which one end of a blade is caused to assume a greater radial distance from the central shaft than the other end of the blade.

19. Blade pitching—a general principle of speed control in which a blade is caused to rotate about a radial axis of the turbine.

20. Blade toggle pitching—a variant of blade pitching employing two support arms per blade in which the radial axis of blade rotation is an imaginary line approximately equidistant between the two support arms.

21. Blade extension—a technique whereby the turbine radius is allowed to increase in response to centrifugal forces acting on the blade assemblies.

22. Paralleling—a general principle of speed control in which the turbine blades remain parallel with one another while rotating, but collectively deviate from parallel with the central shaft of the turbine.

23. Tower tipping—a general principle of speed control in which the entire turbine tips away from the prevailing wind.

BRIEF DESCRIPTION OF THE DRAWINGS

FIG. 14 is still another form of blade support in a turbine of the present invention providing for speed control by blade extension to achieve blade feathering.

FIG. 14a is a partial top view of FIG. 14 showing the blade supported on a rocking arm which in turn is pivoted on a tensioned cable.

FIG. 15 is a view of the turbine blade support of FIG. 14 illustrating the blade support during blade feathering.

FIG. 15a is a partial top view of FIG. 15 showing the support of the blade of FIG. 15 on extended limit lines.

FIG. 16 is a perspective view of a speed control mechanism for a two bladed wind turbine according to the present invention illustrating a flyweight initiated blade pitching.

FIG. 17 is an elevational view of an alternate form of wind turbine according to the present invention having three blades (only two shown) and illustrating mechanism for flyweight initiated blade pitching speed control.

FIG. 18 is a top plan view of the wind turbine of FIG. 17.

FIGS. 19, 20 and 21 illustrate the blade members of FIGS. 16, 17 and 18 with the blades in, respectively, 0°, 45° and 90° of rotation due to flyweight initiated blade pitching.

DESCRIPTION OF THE PREFERRED EMBODIMENTS

Throughout the following description of the mechanisms contemplated for the present invention, the apparatus will be described as a means responsive to wind forces. It should be understood that the apparatus could be used in any moving fluid stream, such as water or air. To simplify the description of the apparatus, the moving fluid stream will be referred to as wind. The claims will describe a device responsive to a moving fluid stream and the following description is intended to cover moving air or water and other fluid streams.

Figure 1:
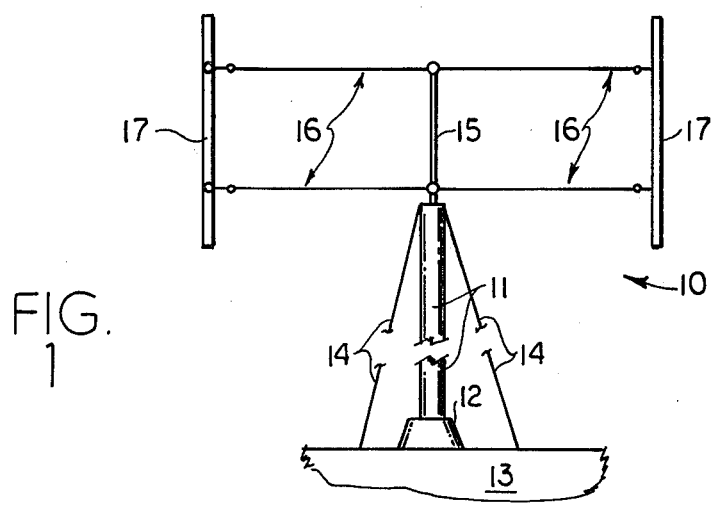
FIG. 1 is an elevational view of one form of the turbine of the present invention mounted on a vertical support member and adapted for rotation about a vertical axis.

The basic vertical axis turbine 10 of FIG. 1 has the essential parts of my invention which permit the turbine to respond to the forces of a wind moving relative to the turbine structure. As illustrated, the turbine 10 comprises a tower structure 11, supported on a base 12, resting on the ground or another fixed surface 13, and having guy wires 14 for maintaining the tower structure 11 in desired position. Extending vertically from the tower structure 11 is a shaft 15 that is to be rotated by reactions to the forces of the moving wind stream. Shaft 15 is supported in rotary bearings within tower structure 11 and the rotation of shaft 15 may drive a generator or other energy conversion device housed in base 12.

Figure 2:
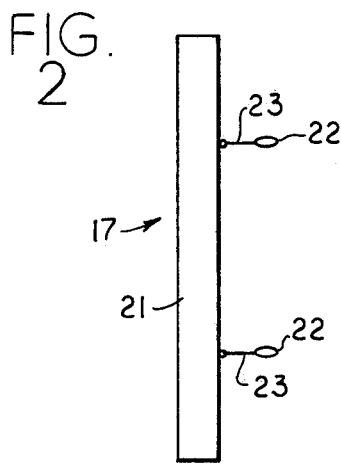
FIG. 2 is a side, vertical, elevational view of a blade assembly of the turbine of the present invention.
Figure 3:
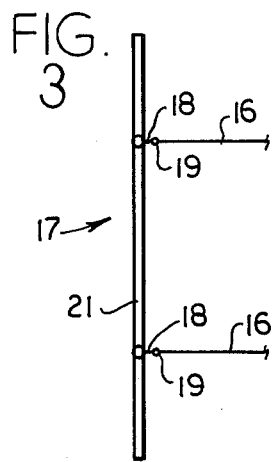
FIG. 3 is a partial front, vertical, elevational view of the blade assembly of FIG. 1 looking toward the leading edge thereof.

A plurality of supporting means or arms 16 are operably mounted with a fixed end on shaft 15 in a manner to cause shaft 15 to rotate as the device responds to the wind. As shown in FIG. 3, a blade assembly 17 is supported on the supporting means, which assembly 17 includes a rocking arm 18 fixed to the free end of supporting arm 16 as in the form of a simple hinge 19, or which hinge may, if desired, be a two dimensional hinge such as a universal joint, or a three dimensional hinge such as a ball hinge. The other end of the rocking arm 18 is fixed to approximately the leading edge of a blade 21. The blade 21 is preferably an elongated symmetrical airfoil element with its elongated axis generally vertical and parallel to the shaft 15 when at rest. As shown in FIG. 2, at least one counterweight 22 is attached to the leading edge of the blade 21 on a counterweight arm 23. The blade 21, counterweight 22, counterweight arm 23 and rocking arm 18 constitute the blade assembly 17 having articulation with respect to the supporting arms 16 but attached to the supporting arms so as to cause the blades to move the arms and rotate the shaft 15 as the blades move under forces from the wind.

As shown in FIGS. 2 and 3, the blade member may be provided with more than one counterweight and preferably a counterweight arm is provided adjacent to each rocking arm. The counterweights constitute approximately 25% of the total weight of each blade assembly.

Figure 4:
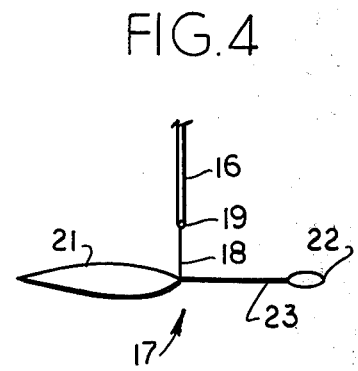
FIG. 4 is a top, plan enlarged view of a blade assembly.

FIG. 4 illustrates an enlarged view of the supporting arm-rocking arm hinge connection.

Figure 5:
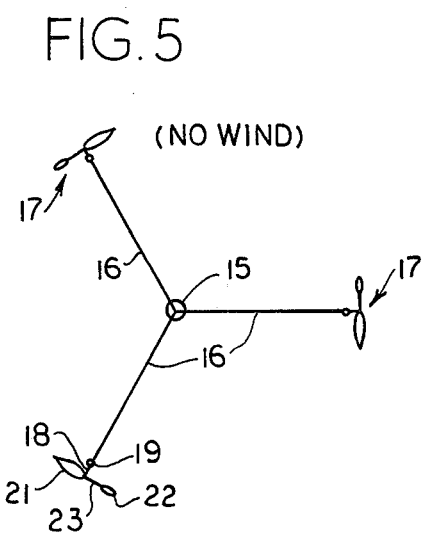
FIG. 5 is a top, plan view of a three blade turbine of the present invention illustrating the blades aligned in their neutral position, as would occur if the shaft were mechanically rotated under windless conditions.
Figure 6:
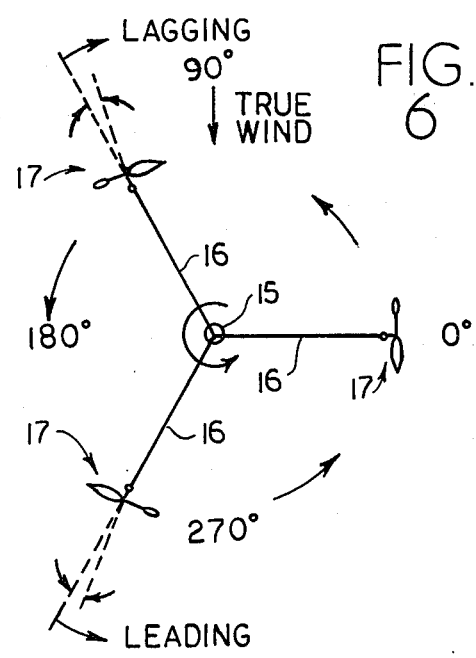
FIG. 6 is a top plan view of a three blade turbine of the present invention illustrating the blade articulation as the turbine rotates in response to moving fluid currents.

FIGS. 5 and 6 illustrate in plan view the blade assembly 17 mounting on supporting arms 16, here shown as three arms, mounted to a central shaft 15. FIG. 5 illustrates the position the blade assembly 17 would assume if the shaft 15 were rotating but no wind was acting on the blades. The blades are shown in their neutral position throughout the blade orbit. FIG. 6 illustrates positions of the blade assemblies 17 when a wind is acting on the blades to cause rotation of the shaft 15. The blades 21, because of their airfoil configuration, will rotate into the relative wind with the counterweight 22 leading into the relative wind. As the blade heads (or points) directly into the true wind (0 degrees in a polar diagram), as shown in FIG. 6, the blade assembly 17 switches from a leading rock angle to a lagging rock angle. As the blade heads (or points) directly away from the true wind (180 degrees in a polar diagram), the blade assembly 17 switches from a lagging rock angle to a leading rock angle. The blade assembly 17 is permitted to lead and lag by the hinge connection 19 of the rocking arm 18 to the support arm 16.

The blade experiences a momentary decrease in velocity when passing the polar angle of 0 degrees and, conversely, each blade experiences a momentary increase in velocity when passing the polar angle of 180 degrees. For a small wind turbine operating at a high tip-speed ratio, the rock angle reversal of the blade is gradual and takes place over a large polar angle. But at the lower tip-speed ratios, or for a larger turbine radius, the effect of the lead/lag cycle becomes increasingly pronounced. The rock angle reversal occurs within a small polar angle. In other words, as the equilibrium angle becomes high enough, the blade begins to "flip" during rock angle reversal.

The angle of displacement of the rocking arm from its neutral position is called the rock angle. The rock angle may be forward or backward with respect to the direction of blade travel. Relative forward movement of the rocking arm is leading blade rock. Relative backward movement of the rocking arm is lagging blade rock. During normal operation, the maximum rock angles seldom exceed 30 degrees, except during start-up.

The "flip" at the polar angle of 180 degrees is more pronounced than the "flip" at 0 degrees. The reason that the "flip" is more pronounced at 180 degrees is that the angle of the relative wind is still quite high just prior to 180 degrees, and then the angle of the relative wind drops to zero more quickly than at 0 degrees. This difference is more pronounced at lower blade speed ratios. The quick shift in the angle of the relative wind causes a sudden reduction of the aerodynamic force moment which has been holding the blade at its equilibrium angle. The sudden reduction of the aerodynamic force moment releases the potential energy stored in the blade. The blade then "flips" from one extreme rock angle to the opposite extreme rock angle.

The lead/lag cycle of the blade assembly around its rocking hinge is somewhat analogous to a pendulum, in that the blade assembly stores potential energy during the increase of the rock angle and then releases that potential energy as kinetic energy during the decrease of the rock angle. Like a pendulum, the blade assembly has momentum which causes it to swing past its neutral position (0 degrees rock angle). This momentum of the blade assembly enables the blade to reverse its rock angle quickly, and enables the rock schedule to stay in phase with demand.

For any given blade-speed ratio, the amount of potential energy available for rock angle reversal, at both 0 and 180 degrees, is in proportion to the amount of energy that is required for rock angle reversal at those respective polar angles. At 0 degrees, the blade must swing from a moderate rock angle to the opposite moderate rock angle. At 180 degrees, the blade must swing from a high rock angle to the opposite high rock angle. In other words, there is a match between energy availability and demand, just as there is a match when a pendulum swings from an equilibrium angle to the opposite equilibrium angle.

Figure 8:
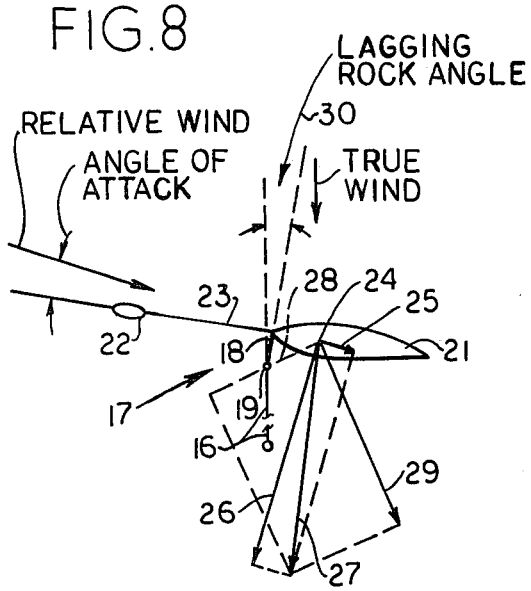
FIG. 8 is a top plan view illustrating the aerodynamic articulating force acting on a blade member which is in the upwind position (polar angle 90°) under normal operating conditions.
Figure 9:
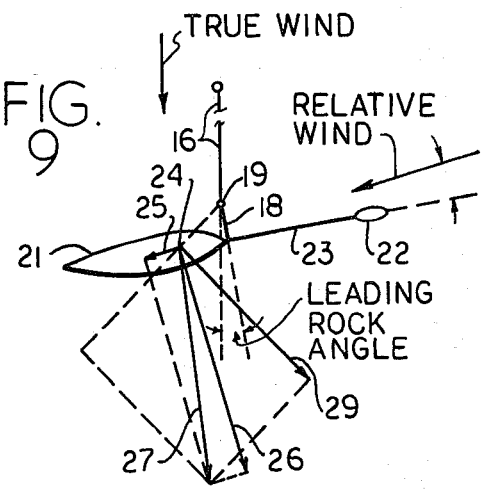
FIG. 9 is a top plan view illustrating the aerodynamic articulating force acting on a blade member which is in the downwind position (polar angle 270°) under normal operating conditions.
Figure 7:
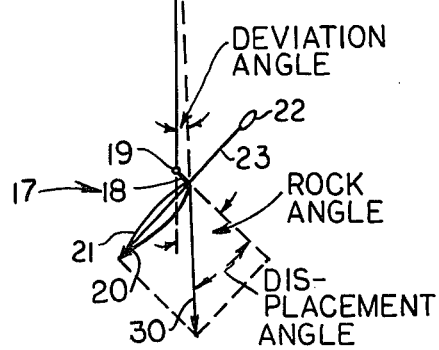
FIG. 7 is a top plan view of a blade member and its supporting arms illustrating the centrifugal restoring force acting on a rotating blade under normal operating conditions.

FIGS. 7, 8 and 9 illustrate the articulation of the blade assembly and the blade articulation forces acting on the blade assembly when the blade is at its extreme downwind and extreme upwind positions. The desired length of the rocking arms depends on a number of variables. These variables include: the radius of the supporting arms; the weight, chord length, and profile of the blades; the solidity of the turbine; and the preferred blade-speed ratio. While a mathematical procedure for selecting the optimum proportions for the variables is not herein disclosed, in practice the method of trial and error provides a satisfactory method for determining the length of the rocking arms.

The center of mass of the blade assembly 17 is approximately where the blade and counterweight arm join and this point can be likened to the bob of a pendulum. The hinge 19 is analogous to the pivot point from which the bob hangs, and the rocking arm 18 is analogous to the pendulum rod. Here, the weight of the bob, as shown in FIG. 7, is the centrifugal force 30 acting on the center of mass of the blade assembly. The restoring force 20 is that force which acts to restore a pendulum to its neutral position. In the case of the present wind turbine, the centrifugal restoring force acts to restore the blade assembly to its neutral position (zero rock angle). Like a pendulum, the restoring force is the same whether the rocking arm swings forward (lead rock) or swings backward (lag rock).

It is important to note that the centrifugal restoring force 20 and the aerodynamic articulating force 29 each produce torque about the hinge 19, but that each torque acts in opposition to the other. Also, the two forces act over different moment arms.

The length of the rocking arms 18 is approximately equivalent to the centrifugal moment arm between hinge 19 and the leading edge of the blade 21. Increasing the length of the rocking arm increases the centrifugal moment arm. Thus, the longer the rocking arms, the greater the restoring torque acting to retain a blade in its neutral position. This restoring torque is the product of the centrifugal restoring force 20 and the length of the moment arm. Thus, as seen in FIG. 7, increasing the length of the rocking arms would cause the blades to articulate relatively less, and would cause the blade-speed ratio to increase. It is important to note the distinction between the rocking arm and the effective rocking arm, since the two may be approximately coincident, as in FIG. 7, or quite distinct. The centrifugal restoring force is, strictly speaking, determined by the length of the effective rocking arm regardless of the length of the rocking arms.

As shown in FIGS. 8 and 9, the aerodynamic forces acting on the blades may be described as acting through one point; the center of lift of the blade at 24. The center of lift is approximately 30% back from the leading edge of the blade. The exact location varies with different types of blades. The center of lift also shifts forward somewhat as the angle of attack of the blade increases.

When a blade moves through its relative wind, two forces are produced; lift 26 and drag 25. Lift is perpendicular to the relative wind and drag is parallel with the relative wind. These two forces may then be resolved into one aerodynamic force vector 27. This resultant aerodynamic force vector 27 may then be used to determine the component force vector which acts to articulate the blade (the articulating force 29). The articulating force 29 acts perpendicular to its moment arm. The axis point of the articulating moment arm corresponds to the hinge 19. An imaginary line may be drawn between the center of lift of the blade 24 and the hinge 19. This line represents the moment arm of the articulating force 29.

To summarize, the centrifugal restoring force 29 acts approximately through the rocking arm 18 while the aerodynamic articulating force 29 acts through the moment arm between hinge 19 and the center of lift 24. Each force produces torque around the hinge 19. Each torque opposes the other. The articulating force decreases as the restoring force increases. Articulation continues until the articulating torque is balanced by the opposing restoring torque; i.e., until the blade attains its equilibrium angle. In practice, the equilibrium angle changes continuously in response to changes in the strength and direction of the relative wind. Only minimal aerodynamic force is required for rock angle reversal, since blade rocking momentum provides most of the required energy.

During start-up, the blades of the present wind turbine reach the full rocking limit of approximately 45 degrees lead and 45 degrees lag. The hinges are constructed so as to limit the degree of blade rock to a total of about 90 degrees. This limit is necessary because, during start-up, there is very little centrifugal force acting on the blades. Without such a limit, the blades would simply weathervane and produce no starting torque. However, with the limits imposed by the hinges, the blades are able to produce high starting torque, which is partly due to the high drag of the blades during start-up. During start-up, the wind turbine of the present invention functions much like a low speed, drag-type windmill. The high drag on the blades occurs on the side of the windmill on which the blades are moving with the true wind. There, the blades become perpendicular to the wind. The blades which are moving into the true wind, however, create little drag. As the windmill accelerates, the blades gradually articulate less. There is no noticeable transition between the start-up (drag induced torque) and the normal operating speeds (lift induced torque).

FIG. 8 illustrates the blade assembly 17 at the "up wind" position (90° polar angle) and acting against a relative wind so as to have an angle of attack with the relative wind. Under the condition illustrated, blade 21 produces a drag illustrated by drag vector 25 and a lift illustrated by lift vector 26 producing a resultant aerodynamic force illustrated by vector 27. Vector 27 can be resolved to illustrate the force causing articulation of the blade member about the rock hinge 19. The articulating force acts perpendicular to the moment arm represented by the effective arm 28 between the hinge 19 and the center of lift 24. Resolving the resultant aerodynamic force vector 27 into vectors parallel to the effective arm 28 and perpendicular to that effective arm determines the aerodynamic articulating force vector 29. These forces produce a lagging rock angle as at 30.

FIG. 9 illustrates the blade assembly at the "downwind" position (270° polar angle) as the blade travels into its relative wind so as to have an angle of attack with the relative wind. The forces produced by the wind acting on the blade are substantially the same as those described with respect to FIG. 8; however, in FIG. 9 the rocking arm 18 is ahead of the axial extension of the supporting arm 16 and the forces produced by the drag and lift vectors 25 and 26, respectively, result in an aerodynamic force vector 27 which is resolved into an articulating force vector 29 acting on the effective lever arm of length from hinge 19 to center of lift 24. The articulating force acting on the blade acts to rotate the blade assembly around the hinge until balanced by the centrifugal restoring force 20.

The centrifugal forces acting on the blade assemblies are approximately proportional to the square of the ground speed of the blades. The aerodynamic forces acting on the blade assemblies are approximately proportional to the square of the air speed of the blades. For a given blade speed ratio, these two types of forces increase and decrease at the same general rate, as the true wind speed increases and decreases. In other words, there is an overall equilibrium between these two types of forces which is determined by the blade speed ratio. Within the overall equilibrium, the blade assemblies also respond to cyclic variations of the aerodynamic forces during each revolution. Consequently, the equilibrium rock angles of the blade assemblies are determined by both the overall equilibrium and the cyclic equilibrium of these two types of forces. For instance, if the wind gusts, the blade speed ratio of the blade assemblies is therefore reduced, and the overall equilibrium shifts in favor of the aerodynamic forces. Increased blade articulation then occurs, and the angles of attack of the blades are consequently maintained within effective limits.

Overspeed control is inherent in the design of the turbine of this invention due to counterweight arm flexing in response to excessive centrifugal force. As the counterweight arm flex, the blade assembly becomes unbalanced, which causes the lagging rock angles (upwind) and the leading rock angles (downwind) to become too small or too large, respectively, for efficient operation. In other words, counterweight arm flexing causes blade feathering. Any means by which the position of the counterweight is shifted, so as to unbalance the blade, may be used for overspeed control. For instance, the counterweight arms may be hinged so as to raise or lower the counterweight, or the counterweight may be shifted forward or backward along the counterweight arm.

Another type of inherent overspeed control is achieved by using a moderately flexible blade skin. The blade skin is prestressed by bending it around a leading-edge blade-spar, and the blade skin therefore does not require internal bracing in order to maintain its correct camber. Blade skin stiffness is selected so that the inward-side blade skin deforms only when centrifugal force becomes excessive. As the blade skin deforms, blade lift is reduced during the upwind half of the blade's orbit, thus limiting turbine rpm.

Additional controllable and easily variable overspeed controls are herein disclosed. These overspeed controls make the present invention more versatile with respect to various applications and permit the turbine to be constructed more lightly yet still strong enough to withstand severe conditions.

Figure 10:
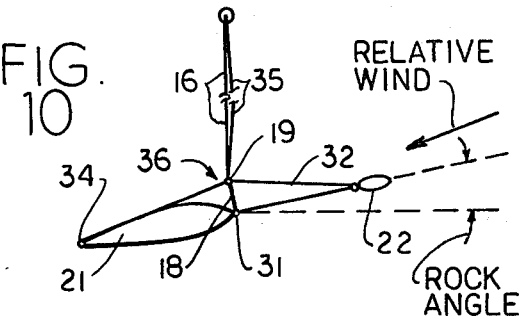
FIG. 10 is a top plan view of an alternate blade support and articulating mechanism illustrating a blade and support mechanism alignment during normal operation.
Figure 11:
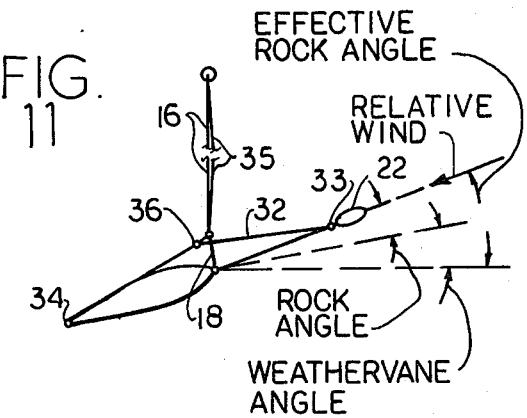
FIG. 11 is a top plan view similar to FIG. 10 illustrating the alternate blade support and articulating mechanism alignment as the blade of FIG. 10 is caused to increase its effective rock angle beyond that of normal operation.

One form of speed control is illustrated in FIGS. 10 and 11 in the form of a bowstring system for blade feathering. In the bowstring system another hinge is established at 31 between the rocking arms and the leading edge of the blade 21. These hinges 31 are called weathervane hinges. The bowstring system retains the hinges 19 located between the rocking arms and the support arms. These hinges 19 are the rocking hinges. Thus, the bowstring system uses a hinge at each end of the rocking arms.

If a blade is permitted to freely pivot around its weathervane hinges, the blade weathervanes and produces no driving force. For normal operation, it is necessary to prevent the blade from pivoting around its weathervane hinges; that is, the blade must be held approximately perpendicular to its rocking arms. A bowstring cable 32 is used to hold the blade perpendicular to the rocking arms.

One end of the bowstring cable 32 is attached to the counterweight at 33, and the other end is attached to the trailing edge of the blade at 34. A tension cable 35 is attached at 36 to the midpoint of the bowstring cable. The tension cable 35 is run through a leader hole in a block (not shown) located on the rocking hinge. The tension cable 35 extends inward along the support arm and to the central shaft. All tension cables are operated as a unit joined to a single tension cable which may extend down and out the central shaft.

The length of the bowstring cable 32 is designed so that when tight, its midpoint is in contact with the leader hole. Thus the bowstring cable forms a triangulated brace which holds the blade perpendicular to the rocking arm much the same as the form shown in FIGS. 2, 3 and 4.

Loosening the tension cable 35 then causes the blade to feather. The tension cable may be controlled by a variety of simple mechanical devices designed to sense centrifugal force, vibration, ice accumulation, water level, etc. The bowstring system permits a windmill of this form to be left "parked."

With a minor modification, the bowstring system can be used to operate a windmill at a constant rpm. The minor modification is to create the initial bias angle by adjusting the bowstring rather than by shifting the center of mass slightly beyond the leading edge of the blade. The point on the bowstring where the pull cable is attached is shifted slightly toward the trailing end of the bowstring cable. This slight shift causes the blade to assume a bias angle during normal operation. When the blade is weathervaning, the blade remains balanced.

The tension cable 35 may be controlled by a centrifugal governor. The weathervane angle of the blades is gradually increased in response to excessive speed of revolution. The weathervane angle is the angle by which the blade is able to deviate from its fixed position relative to the rocking arms. The weathervane angle increases the effective rock angle (equilibrium angle) of the blade. The effective rock angle is the sum of the rock angle and the weathervane angle. As the mean effective rock angle increases, the blade-speed ratio of the windmill of the present invention decreases.

Figure 12:
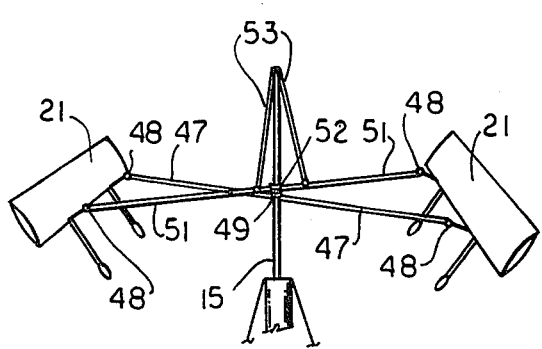
FIG. 12 is a perspective view of one alignment of a two blade turbine with the blades in an at rest, toggle pitched position.

FIG. 12 illustrates the resultant action of toggle pitching speed control. Ball hinges 48, or their equivalent, are used for the rock hinges in order to achieve toggle pitching. The lower support arms 47 are rigidly attached at 49 to the central shaft 15, but the upper support arms 51 are joined to a ring 52 which is free to move up and down the central shaft 15 in a spiraling motion. As the ring 52 spirals downward, so do the upper support arms 51, thereby pitching the blades 21 forward. Lifting the ring 52 restores the blades to their normal vertical position similar to that shown in FIG. 1. During toggle pitching, the upper support arms rotate approximately 45 degrees relative to the lower support arms.

The toggle pitching of each blade is produced by a combination of blade torque and gravity acting about the pivot point of its lower rocking hinge. To raise the ring and retain it in its operating position, a split cable 53 is run up and out the top of the central shaft, over pulley wheels (not shown), and then down to join with the upper support arm 51 adjacent to ring 52. The cable may be tensioned by a spring located inside the central shaft 15.

Figure 13:
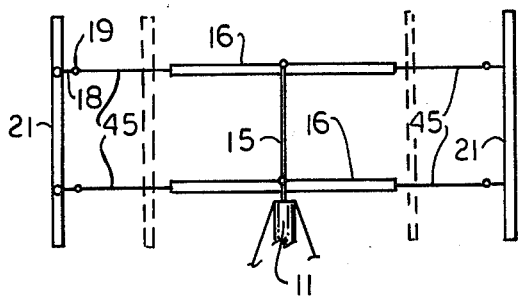
FIG. 13 is a form of blade support in a turbine of the present invention providing blade extension for the purpose of increasing the swept area.

FIG. 13 illustrates a form of blade support providing for speed control by extension. The primary purpose of this extension (FIG. 13) is to increase the swept area, thereby increasing the power to weight ratio. The secondary purpose is to control the revolutions per minute. This form of speed control involves the use of two support arms 16 for each blade 21. One form of apparatus to accomplish this control employs spring loaded cables 45 through both support arms 16 and attached to the hinges 19. If all of the cables are attached to the same spring, the blades will extend outwardly parallel to the central shaft.

The blade assemblies function normally when extended on cables only. Since the blades are no longer connected to the support arms by rigid members, it might seem that the turbine could not function. However, high centrifugal forces act to stiffen the cables to such an extent that considerable torque may be transmitted from the blades to the support arms via the cables.

FIGS. 14 and 15 illustrate a cable system for providing feathering control of the blades of a turbine. When a blade is feathered, it is caused to function at an inefficient angle of attack. The blade produces less driving force. The apparatus of FIGS. 14 and 15 uses a simple cable system to feather the blades. The cable system permits the feathering of the blades to occur either in response to excessive centrifugal force or in response to manual control. Also, the cable system permits the turbine of the present invention to be "parked," so that it cannot self-start.

The cable system is arranged so that the blades 21 function normally when the supporting cables are under tension. Releasing the cable tension changes the geometry of the system. The essence of this change is that the pivot point of each blade is shifted. This shift is from the normal position at hinge 19 to the leading edge of the blade 21. The effect of moving the pivot point to the leading edge of the blade is to eliminate the centrifugal restoring force and to cause the blade to feather. In other words, the length of the effective rocking arm is reduced to approximately zero, even though the length of the rocking arms remains unchanged.

The normal (tensioned) position for the cable system is illustrated in FIG. 14 where rigid upper and lower supporting arms 57 are attached to central shaft 15. As shown in FIGS. 14a, blades 21 of the type previously described with rocking arms 18 are aligned with the ends of the supporting arms 57. In the form herein illustrated, the three rocking arms (upper, center and lower) are pivotally hinged to separate cables 58, 59 and 60, respectively, and the three cables are joined to a single cable 61 extending into the central shaft 15 over pulleys 62 and downwardly into the turbine base. The outward ends of cables 58 and 60 are fixed to the outward ends of the supporting arms 57. Limit lines 63 are attached to the leading edges of blades 21 at the upper and lower ends 63a and the outward ends of the supporting arms 57 at 63b. During start-up, the limit lines 63 serve to limit the maximum rock angles of the blades 21.

In the condition of the elements as illustrated in FIG. 14 and 14a, the blades 21 are supported on rocking arms 18 which are pivoted on tensioned cables 58, 59 and 60 and limit lines 63 are limp. In this condition, the blades of the turbine respond to a moving fluid stream and cause rotation of the central shaft by transferring the generated torque through the tensioned cables to the supporting arms 57.

As speed increases the cables 61 are caused to move outwardly from the central shaft 15 (either by centrifugal force acting on suitable mechanisms or by manual control) to permit the blades 21 to move outwardly until the limit lines 63 are under tension, as illustrated in FIG. 15, and the cables 58, 59, 60 and 61 relaxed. In this condition the blades 21 are supported by the limit lines 63 between the outward ends of supporting arms 57 and the leading edges of the blades, as shown in FIG. 15a.

This feathering technique works by shifting the restraint of the blade from the tension cables to the limit lines. The limit lines are attached to the leading edge of the blade. When the tension in the cables is removed, the blade extends outward just enough to take up the slack in the limit lines.

Feathering, in this instance, is increased due to the counterweight 22 being swung outward by centrifugal force. The blades are initially "tuned" by using a small bias angle, and the bias angle is obtained by moving the center of mass of the blades slightly ahead of the leading edge of the blades 21. Consequently, when the pivot point of a blade is shifted to the leading edge of the blade, the blade is unbalanced, and the counterweights swing outward. As the counterweights 22 swing outward, the angle of attack of the blade is disrupted. Retensioning the cables 58, 59, 60 and 61 causes the system to resume normal operation.

FIG. 16 illustrates one form of turbine speed control in the form of blade pitching. As shown in perspective, a tower structure 11 has a turbine drive shaft 15 with a supporting arm 16 operatively connected to the shaft but in a manner to permit rotation about an axis perpendicular to the shaft. The supporting arm 16 is connected at its middle to the shaft 15 and supports a blade assembly 17 at each end. The blade assemblies include a rocking arm 18 hinged at 19 to supporting arm 16 and attached to a blade 21 at its other end. The blade 21 carries at least one counterweight 22 and its associated counterweight arm 23.

A pair of flyweights 64 and 65 are mounted at the ends of a flyweight shaft 66 fixed at its midpoint to supporting arm 16 at the rotatable connection of the supporting arm 16 to the shaft 15. A spring 67 operates between the flyweight shaft 66 and the shaft 15 to maintain the flyweights biased toward the shaft 15. The flyweights and flyweight shaft are slightly off of parallel with shaft 15 so that, at rest, the flyweights are close to the shaft but, as the turbine speed increases, centrifugal forces acting on the weights causes them to move outwardly away from the shaft 15. Outward movement causes rotation of supporting arm 16 about the axis perpendicular to the shaft 15 and thus initiates pitching of the blade assemblies. One blade pitches forward as the opposite blade pitches backward. Once pitching is initiated by the flyweights, centrifugal force acting on the blade assemblies causes them to pitch further, since pitched blade assembles have a greater average distance from the central shaft than do blade assemblies in their normal operating position.

Speed control is accomplished with the mechanism here illustrated by causing each part of the blade to function at a different polar angle; that is, as blade pitching progresses, an increasingly larger part of the blade is unable to achieve an efficient angle of attack. As the blade slows, the bias of spring 67 overcomes the centrifugal force acting on the flyweights and the supporting arm is rotated to bring the blade assemblies into a more effective angle of attack with the relative wind.

FIGS. 17-21 illustrate a turbine speed control in the form of blade pitching. The blade pitching overspeed control technique involves the use of one support arm 16 for each blade 21. The support arm is attached to the hinge 19 of a single rocking arm 18. The rocking arm is located at the midpoint of its blade. The rotation of the support arms may be initiated by using a flyweight system as shown in FIGS. 17 and 18 where a separate flyweight is shown for each of these support arms. The flyweights are a weight 41 at the end of a post 42 attached to the support arms 16. The flyweight lever arms 42 are located near the central shaft 15. The flyweight lever arms are attached to the support arms and to a common spring-loaded cable. Excessive centrifugal force acting on the flyweight causes the support arm 16 to be rotated. When the support arms 16 are rotated, the blades 21 are also rotated, or pitched. The blades pitch forward rather like the sail of a boat when the boat pitches forward; however, the blade can be pitched forward a full 90°. When the blades are pitched forward 90°, the spans of the blades are horizontal. The blades can produce no shaft torque when they are horizontal.

In practice, it is only necessary to pitch the blades forward about 10° to 20° in order to significantly to reduce the driving force. When a blade 21 pitches forward, the top end of the blade has a polar angle which is different from the polar angle of the bottom end of the blade. It is therefore impossible for the blade to maintain its optimum angle of attack. In other words, blade pitching both reduces the swept area of the turbine and also prevents the blades from operating at their optimum angle of attack. An additional advantage of using blade pitching is that the turbine of the present invention can be left "parked" with the blades in the horizontal position.

The foregoing section has described the overspeed control technique referred to as "blade pitching," in which each blade assembly is pitched forward around the radial axis of its support arm. Toggle pitching, as described in FIG. 12, achieves a similar pitching of the blade assemblies, but uses a different principle. While blade assembly pitching is appropriate for turbines using one support arm per blade, toggle pitching is appropriate for turbines using two support arms per blade assembly.

Figure 22:
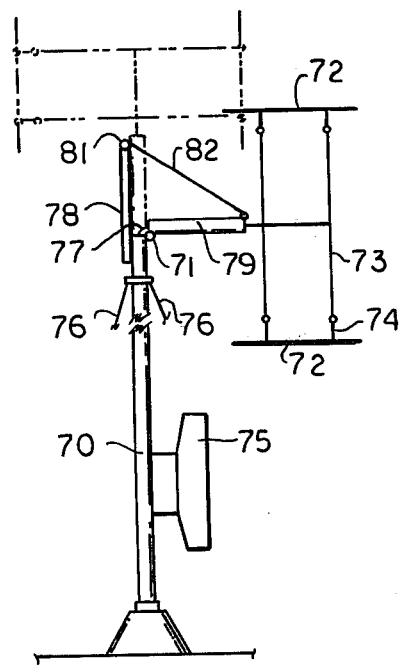
FIG. 22 is a front elevational view of an alternative form of a wind turbine of the present invention illustrating a speed control in the form of tower tipping.

FIG. 22 illustrates a form of the turbine of the present invention which provides tower tipping as a means for accomplishing both overspeed control and a parking alignment for the turbine. As illustrated in full lines in FIG. 22, the turbine blades are shown tipped to a horizontal alignment so as to be parallel to the base or ground and in alignment with the flowing fluid stream. This position is the parked position.

As the name implies, the entire tower, or some portion of it, is allowed to tip, or bend, downwind. For parking, the wind turbine is tipped 90°, and thus serves as its own "tail vane" to insure horizontal weathervaning. It is necessary to use at least three blades, or their gyroscopic equivalent, in order to avoid the same type of precessional vibration which is usually associated with the orienting of two-bladed horizontal axis wind turbines.

One possible configuration for tower tipping consists of a pipe tower 70 having a hinge 71 located a little below the turbine blades 72. The turbine blades 72 are supported on supporting arms 73 and rocking arm 74 as previously described. The pipe tower is oriented to the wind by a tail vane 75 mounted low enough to clear the tower guy wires 76. The hinge permits the wind turbine to tip downwind in response to excessive wind pressure. The turbine drive shaft has a flexible section or universal joint connection 77 which permits the turbine drive shaft to bend in unison with the tower.

To hold the wind turbine upright for normal operation, a vertical beam 78 is attached below the hinge and extends upward on the windward side of the upper tower section 79. A pulley wheel 81 is mounted at the tip of the beam 78. A spring loaded cable 82 is affixed to the upper tower 79, run over the pulley wheel 81, and down to the lower end of the pipe tower.

Also shown in FIG. 22, in phantom lines, is the alignment of the wind turbine under normal operating conditions. In normal operation the turbine has the general configuration as shown in FIG. 1 except that the preferred form for a tower tipping turbine is to have three or more blades 72.

FIGS. 23 through 26 illustrate the overspeed control technique of paralleling. Paralleling may be used with single stacked turbines having three or more blades around the central rotatable shaft and with one support arm per blade.

Figure 23:
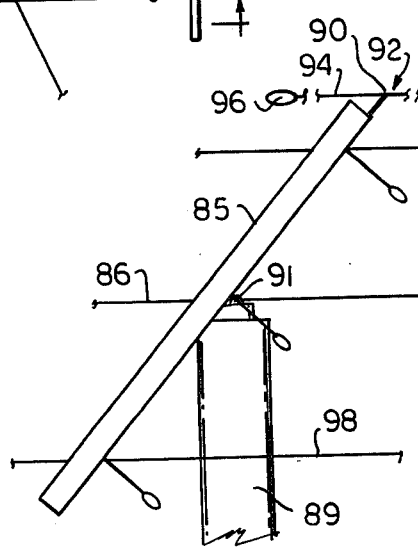
FIG. 23 is a front elevational view of an alternative form of a wind turbine of the present invention illustrating mechanism for overspeed control in the form of paralleling.

As illustrated in elevation in FIG. 23, with the front and rear blades not shown, a four blade turbine constitutes blades 85 supported on supporting arms 86 with rocking arms 87 having ball hinges, or the like, at 88 to provide for full 90° bends. The turbine is supported on a tower 89 and includes an upper shaft 93 connected by non-torque transmitting means to the drive shaft (not shown) at 91 at the top of the tower. The hinge 91 is a horizontal axis hinge with its axis aligned perpendicular to the wind by the wind vane 92. The hinge 91 is mounted on a short, hollow, vertical orientation shaft (not shown) mounted in bearings located within the upper end of the drive shaft (not shown). The upper shaft 93 is held upright by a spring loaded cable which runs over a pulley wheel, located at the top of the orientation shaft. The tension cable then runs down through the orientation shaft, down through the drive shaft, and out the bottom of the drive shaft (torque tube). Excessive aerodynamic drag acting on the wind vane structure 92 causes the upper shaft 93 to tip away from the wind. A wind vane 92 is connected to the upper shaft 93 by a hinge 90 and positioned above the turbine. The vane 92 includes an elongated body 94 perpendicular to the shaft, a tail vane 95 at one end and a counterweight 96 at the other end.

Figure 24:
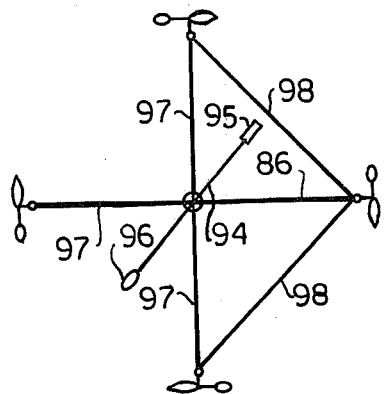
FIG. 24 is a top plan view taken along the lines A—A of the mechanism of FIG. 23.

FIG. 24 is a plan view along section lines A—A of FIG. 23 illustrating a four blade turbine with cross cables 97 for the top of blades 85 (shown in the quadrants to the left of center in FIG. 24) and the diamond cables 98 for the bottom of the blades (shown in the quadrants to the right of center in FIG. 24). It should be apparent that the diamond cables 98 are needed to permit the blades 85 to tip with respect to the central tower 89 and that the combination of the diamond cables 98, the supporting arms 86 and the cross cables 97 having a bearing connection 99 (FIG. 23) with shaft 93 keep the blades 85 operating as a unit when rotating about the tower 89.

Figure 25:
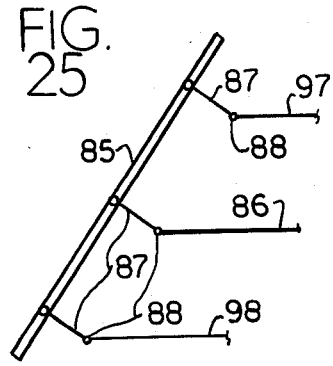
FIG. 25 is an elevational view of the lefthand blade of FIG. 23 when paralleling has commenced to about 45°.

FIG. 25 illustrates the blades 85 with rocking arms 87 connected at hinge 88 to cross cables 97, supporting arms 86, and diamond cables 98. In the position illustrated, the blade 85 has become tilted in response to excessive pressure on the tail vane 95 from the wind (or fluid) flow.

Figure 26:
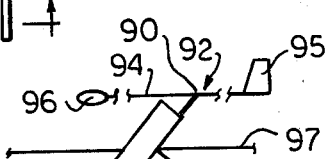
FIG. 26 is a partial front elevational view illustrating the response of the mechanism of FIG. 23 to paralleling speed control.

FIG. 26 illustrates a tilted blade 85 in elevation and shows the blade and vane alignment when tilted. As illustrated, the shaft 93 tilts about hinge 91 carrying the blades 85 in the same angle of tilt as the shaft 93.

The ultimate tilt of the blades 85 places them in substantial parallel alignment with the wind in a position where no driving torque is produced by the blades and therefore no rotary motion for the drive shaft.

During paralleling, all of the blades remain parallel while both tipping in the plane of the wind and continuing to revolve around the central shaft. Paralleling might, in a sense, be described as the simultaneous occurrence of blade rolling and blade pitching. When overspeed control has begun, blades in the upwind and downwind positions look as if they are tipping; the top of the upwind blade tips inward, and the top of the downwind blade tips outward. Blades in the crosswind positions look as if they are pitching; the advancing blade pitches backward; and the retreating blade pitches forward. Once the blades reach the horizontal position, they lie parallel to each other, and with their spans parallel to the wind. The purpose of the tail vane is to insure that the blades tip away from the wind and remain parallel to the wind once they are horizontal.

Figure 27:
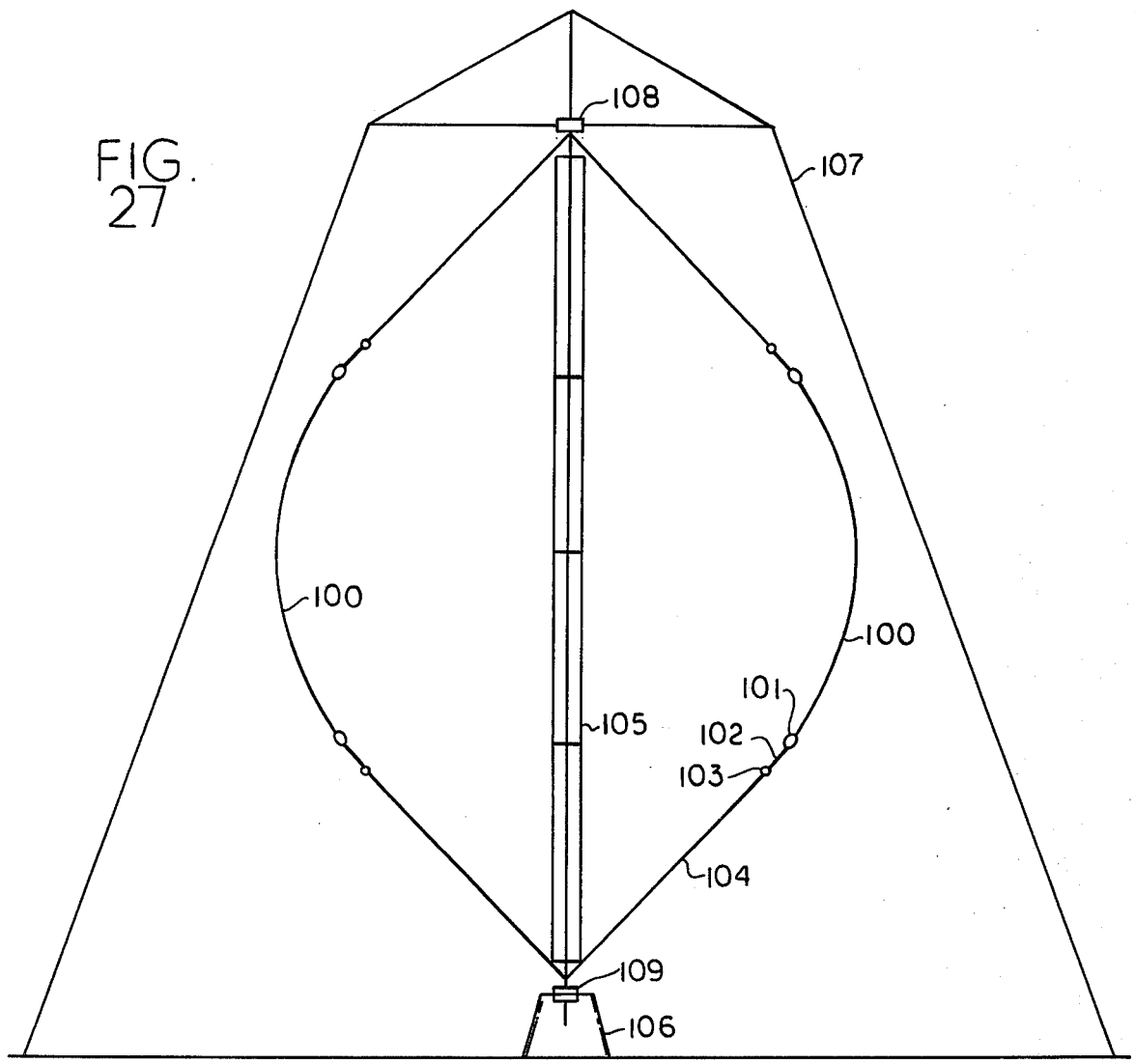
FIG. 27 is a front elevational view of a vertical axis turbine of the present invention using a curved blade construction.

FIG. 27 illustrates a further alternative for the construction of a turbine in accordance with the present invention. In this form blades 100 are curved to assume a form bowed outwardly. The blades 100 have upper and lower counterweights 101 of the same form as illustrated for blades 21 of FIGS. 1-4. Rocking arms 102 mounted to the blades 100 are attached in a rocking hinge connection at 103 to support arms 104 extending radially at an angle from central shaft or tower 105. The turbine is mounted in a bearing 109 in stub tower 106 and guyed by guy wires 107 providing a support for a bearing 108 holding the upper end of the tower 105 in compression.

The blades 100 of this form of turbine are movable about hinge 103 in response to the relative wind in the same way as the blades of FIGS. 1-4. While the parts of the curved blade construction are directly analogous to the parts shown in FIGS. 1-4, it should be noted that other curved blade configurations are possible. The effective rocking arm length is modified by changing the location of the counterweight arms along the curve of the blade. Therefore, the length of the rocking arms is arbitrary, since the blade and rocking arms form a continuous member which produces aerodynamic lift. In other words, the curvature of the blade, itself, is sufficient to create the effective rocking arm.

Figure 28:
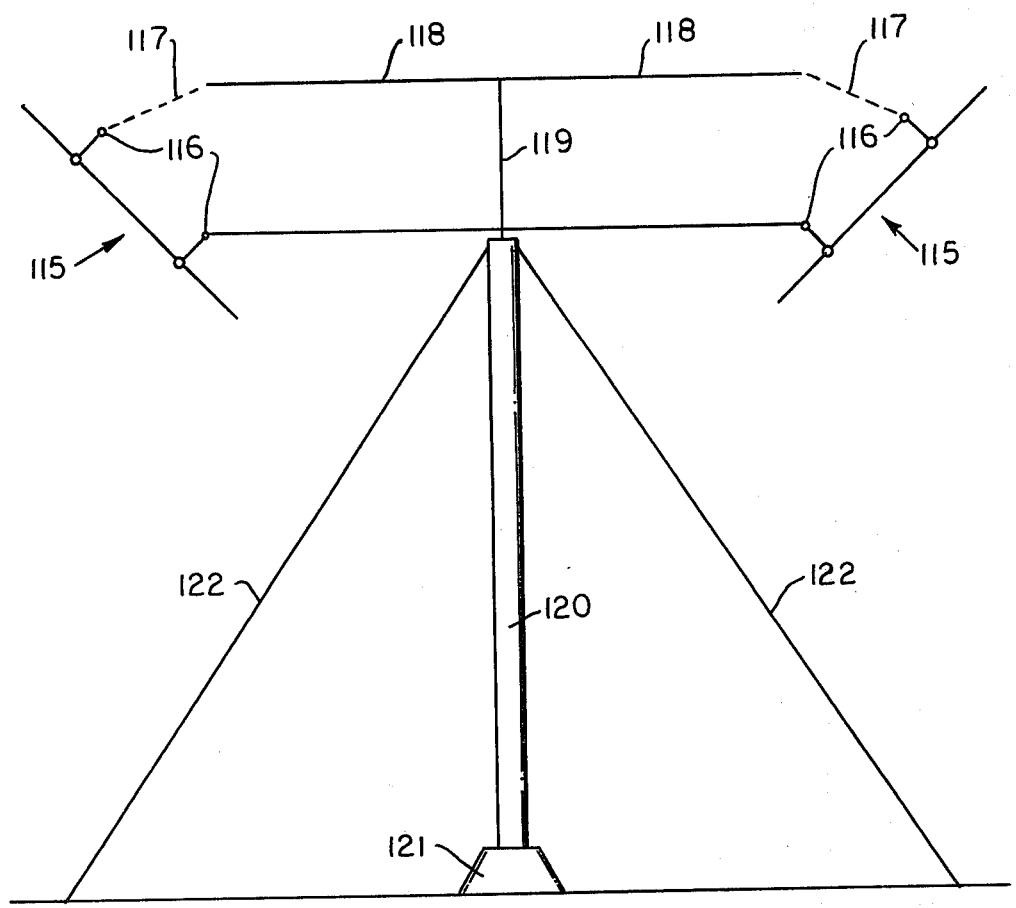
FIG. 28 is a front elevational view of a wind turbine of the present invention illustrating a speed control in the form of blade rolling.

FIG. 28 illustrates another form of speed control possible with the present invention—blade rolling, whereby only one end of each blade assembly is permitted to extend outward in response to excessive centrifugal force. The blade assemblies 115 are shown at a blade rolling position of approximately 45 degrees from vertical, with the upper ends of the blade assemblies extending outward. In practice, either the upper or the lower ends of the blade assemblies may be extended outward. The hinges 116 may be two dimensional, such as univesal joints, or three dimensional, such as ball hinges. As shown, the upper hinge for each blade assembly is attached to a tension cable 117 which is run through the upper support arm 118 and down the central shaft 119, which extends vertically from tower structure 120 supported on base 121. Guy wires 122 maintain the tower 120 in the desired vertical position. Shaft 119 is supported in rotary bearings within tower structure 120 and then rotation of shaft 119 may drive a generator or other energy conversion device housed in base 121. All tension cables are joined to a master tension cable (not shown) which is held in tension by one of several devices such as a spring, a weight, a float, etc., depending upon the application of the turbine.

As blade rolling increases, opposite ends of each blade experience different blade speed ratios, and increasingly larger portions of each blade are therefore prevented from operating at an efficient angle of attack. An increase in blade rolling also causes a reduction in blade bending stresses. Since blade articulation permits the present turbine to operate at a blade speed ratio which is much lower than that required for non-articulating straight blades, blade stress is substantially lower at equivalent wind speeds (centrifugal force is proportional to the square of the blade speed). The present turbine is therefore able to operate at much higher wind speeds before blade rolling must be initiated, and once blade rolling is initiated the present turbine is able to continue to operate at its full rated power in unusually high winds. In other words, the integration of blade articulation and blade rolling permits the present turbine to achieve a substantially larger annual energy output than comparable wind turbines using the combination of non-articulating blades and blade rolling.

The various forms of turbines illustrated and described herein provide a variety of speed controls each intended to protect the turbines and their blades from excessive wind. The blades are flexibly supported on support arms with rocking arms providing pivotal support to permit the blades to maintain efficient alignment with the relative wind. The blade support and turbine assembly permits the blades to provide speed control in the form of feathering, rolling, pitching, extending, tower tipping, paralleling, toggle pitching, and various combinations of the foregoing.

In some of the figures different reference numbers have been used for elements which are the same or similar to elements in other figures. The use of such different reference numbers is not intended to necessarily mean a different construction but is intended to assist the reader in following the description.

In most cases, the central rotatable shaft is substantially vertical with the blade member rotating about a vertical axis. However, the central rotatable shaft can also be substantially horizontal with the blade members rotating about a horizontal axis. In either configuration, it is contemplated that blade members can be placed adjacent each other, thus providing blades stacked vertically about a vertical central axis or horizontally about a horizontal shaft.

While certain preferred embodiments of the invention have been specifically disclosed, it should be understood that the invention is not limited thereto as many variations will be readily apparent to those skilled in the art and the invention is to be given its broadest possible interpretation within the terms of the following claims.

I claim:

1. A turbine responsive to a moving fluid comprising:
   (a) a rotatable central shaft,
   (b) supporting means operably mounted on said central shaft and having a free end extending in a radial direction from said central shaft,
   (c) a blade assembly pivotally supported on said free end of said supporting means whereby interaction between a moving fluid and said blade assembly causes rotation of said central shaft,
   (d) said blade assembly comprising at least one rocking arm means pivoted on said supporting means, a blade member attached to said rocking arm means, at least one counterweight arm attached to said blade, and a counterweight fixed to said counterweight arm
   (e) said attachment of said rocking arm means on said supporting means being articulated in response to said interaction between said moving fluid and said blade.

2. The turbine of claim 1 with a plurality of blade assemblies, each supported on separate support means and said plurality of blade assemblies being positioned around said central shaft to balance said turbine.

3. The turbine of claim 1 wherein the pivotal support of said blade assembly on said supporting means permits said blade member to automatically adjust the angle of attack between said moving fluid and said blade member.

4. The turbine of claim 1 wherein said supporting means permits said blade assembly to move with respect to said central shaft about an axis extending approximately radially from said central shaft while remaining attached to said central shaft to effect speed control for rotation of said central shaft.

5. The turbine of claim 1 wherein said supporting means comprises at least a pair of arms expandable radially from said central shaft to control the speed or rotation of said central shaft.

6. The turbine of claim 1 wherein said supporting means comprises at least a pair of arms extending radially from said central shaft, said pair of arms supporting a single blade assembly, said arms being spaced axially along said central shaft and only one of said pair of arms being fixed to said central shaft.

7. The turbine of claim 6 wherein at least one of said pair of arms is movable with respect to the other of said arms and said central shaft to permit said blade assembly to rotate about a generally radial axis from said central shaft in response to interaction between wind and said blade.

8. The turbine of claim 2 wherein said sets of blade assemblies remain parallel to said rotatable shaft as said shaft tilts away from vertical in response to excessive fluid stream velocity.

9. The turbine of claim 4 wherein said supporting means is a single diametrical arm supporting one blade assembly at each end, each said blade assembly being movably supported at its longitudinal midpoint to said arm, each said blade being movable about said radially extending axis between 0° and 90° with respect to said support on said central shaft.

10. The turbine of claim 9 wherein said blade is movable between 0° and 90° with respect to said support on said central shaft to accomplish said desired speed control for rotation of said central shaft.

11. The turbine of claim 1 wherein said rocking arm is hinged at one end to said supporting means so as to provide a maximum of less than 180° swing, said less than 180° being less than 90° to either side of alignment with a radial axis from said central shaft.

12. The turbine of claim 1 wherein said blade assembly comprises a blade member, at least one counterweight arm, and a counterweight fixed to said counterweight arm, said counterweight arm positioning said counterweight ahead of the forward edge of said airfoil portion, said blade member being supported on said rocking arm so that the center of mass of said blade member, counterweight arm and counterweight is located approximately at the leading edge of said blade member, and, when said blade member is in its neutral position, the blade chord is tangent to the orbit of said blade member at the center of lift of said blade member.

13. The turbine of claim 12 wherein said counterweight arm has means to permit change of the effective location of said center of mass in response to change in the speed of rotation of said central shaft thereby limiting the rotational speed of said central shaft.

14. The turbine of claim 1 wherein said blade assembly includes counterweight displacement means, whereby displacement of said counterweight unbalances said blade.

15. The turbine of claim 1 wherein the skin of said blade is flexibly responsive to excess centrifugal force, whereby the deformation of said skin reduces the aerodynamic lift of said blade.

16. The turbine of claim 1 wherein said blade assembly in its neutral position is curved in the plane of the central axis.

17. A turbine responsive to a moving fluid comprising:
   (a) a rotatable central shaft,
   (b) supporting means operably mounted on said central shaft and having a free end extending in a radial direction from said central shaft,
   (c) a blade assembly pivotally supported on said free end of said supporting means whereby interaction between a moving fluid and said blade assembly causes rotation of said central shaft,
   (d) said blade assembly comprising at least one rocking arm means pivoted on said supporting means, a blade member attached to said rocking arm means, at least one counterweight arm attached to said blade, and a counterweight fixed to said counterweight arm, (e) said attachment of said rocking arm means on said supporting means being articulated in response to said interaction between said moving fluid and said blade and also allowing one end of a blade member to assume a greater radial distance from the central shaft than the other end of the blade member in response to excessive centrifugal force.

18. The turbine of claim 2 wherein said plurality of blade assemblies are aligned substantially parallel to said central shaft during normal operation and are movable about said attachment of said rocking arm to said supporting means to an alignment other than parallel to said central shaft, thereby limiting the speed of rotation of said central shaft.

19. The turbine of claim 1 wherein the support of said blade assembly on said supporting means includes cable means passing through said supporting arm to a location adjacent to said support of said rocking arm on said support member, said cable means being bifurcated at said location with one end connected to said counterweight arm and the other end connected to said blade member, said rocking arm supporting said blade member on said support arm and said blade member being movable with respect to said rocking arm while restrained by said bifurcated cable means.

20. The turbine of claim 1 wherein said support of said blade member on said rocking arm includes a first flexible cable means passing through said central shaft and to said rocking arm, and a second flexible cable means connected between the approximate leading edge of said blade member and said free end of said supporting means, whereby said blade member is restrained by said first flexible cable means at reduced rotary speed and restrained by said second flexible cable means at higher rotary speed.

21. The turbine of claim 1 wherein said central shaft is substantially vertical and said blades rotate about a vertical axis.

22. The turbine of claim 1 wherein said central shaft is substantially horizontal and said blades rotate about a horizontal axis.

23. The turbine of claim 21 wherein a plurality of blade members are included and said plurality includes blades stacked vertically about a vertical central shaft.

24. The turbine of claim 22 wherein a plurality of blade members are included and said plurality includes blades stacked horizontally about a horizontal central shaft.

25. In a vertical axis turbine of claim 21 responsive to a moving fluid stream and having one or more turbine units including, a base member, a vertical axis orientable tower rotatably supported on said base, means for aligning said tower in alignment with the direction of said moving fluid stream, a set of blade assemblies aligned to each other and to said vertical axis of said tower, said set including at least two blade assemblies, each blade assembly flexibly mounted on at least one supporting arm operatively engaged to a turbine drive shaft aligned with and operating within said tower, the improvement comprising:

said turbine drive shaft having an upper portion and a lower portion;

said orientable tower having an upper portion and a lower portion;

a first torque transmitting connection between said upper and lower portions of said turbine drive shaft;

a second torque transmitting connection between the upper and lower portions of said tower;

said second torque transmitting connection being aligned by said tower whereby said turbine drive shaft may tilt away from vertical at said first torque transmitting connection in response to excessive fluid stream velocity and said tilt is always with the upper portion of said drive shaft moving away from the direction of said moving fluid stream.

26. The turbine of claim 1 wherein the rotatable central shaft is movable up to 90° in response to the moving fluid.

27. A turbine responsive to a moving fluid comprising:

(a) a rotatable central shaft, (b) supporting means operably mounted on said central shaft and having a free end extending in a radial direction from said central shaft, (c) a blade assembly pivotally supported on said free end of said supporting means whereby interaction between a moving fluid and said blade assembly causes rotation of said central shaft, (d) said blade assembly comprising at least one effective rocking arm pivoted on said supporting means, a blade member, at least one counterweight arm attached to said blade, and a counterweight fixed to said counterweight arm, (e) said attachment of said effective rocking arm on said supporting means being articulated in response to said interaction between said moving fluid and said blade.

* * * * *